Sept. 24, 1968  C. E. MENDEZ  3,402,551
HEAT EXCHANGER AND CLEANING APPARATUS FOR TREATING EXHAUST
GASES FROM INTERNAL COMBUSTION ENGINES
Filed Dec. 15, 1966  2 Sheets-Sheet 1

INVENTOR.
CHARLES E. MENDEZ
BY
Cushman, Darby & Cushman
ATTORNEYS

Sept. 24, 1968  C. E. MENDEZ  3,402,551
HEAT EXCHANGER AND CLEANING APPARATUS FOR TREATING EXHAUST
GASES FROM INTERNAL COMBUSTION ENGINES
Filed Dec. 15, 1966  2 Sheets-Sheet 2

INVENTOR.
CHARLES E. MENDEZ
BY
Cushman Darby Cushman
ATTORNEYS

United States Patent Office 3,402,551
Patented Sept. 24, 1968

3,402,551
HEAT EXCHANGER AND CLEANING APPARATUS FOR TREATING EXHAUST GASES FROM INTERNAL COMBUSTION ENGINES
Charles E. Mendez, Tampa, Fla., assignor to Redwing Carriers, Inc., Tampa, Fla., a corporation of Florida
Filed Dec. 15, 1966, Ser. No. 601,904
2 Claims. (Cl. 60—31)

ABSTRACT OF THE DISCLOSURE

The invention relates to apparatus for cooling and cleaning hot exhaust gas from an internal combustion engine so that the exhaust gas may be utilized to dispense or fluidize pulverulent material from a hopper.

The apparatus includes a heat exchanger unit through which the exhaust gases pass and by which they are cooled by water circulation from the water jacket of an engine. The hot exhaust gases travel through the heat exchanger in a tortuous path, as provided by conduits, and heavy soot particles are settled and precipitated out from the hot gases as they travel through the heat exchanger. Valving means are provided for directing hot exhaust gases into the heat exchange unit when desired, and a coupling means is provided for directing the cooled and cleaned gas into separate apparatus for a fluidizing or dispensing operation.

The heat exchange and filtering unit also includes a removable end plate structure wherein all conduits within the unit can be opened at their ends for cleaning out the unit. The cooling and filtering action which takes place is sufficient to clean the hot exhaust gases without the use of additional filtering devices.

Brief description of invention

This invention relates to improved apparatus which functions to cool and clean exhaust gases from an internal combustion engine so that the exhaust gases can be utilized in a fluidizing or dispensing operation. In particular, the invention provides for an improved heat exchange and filtering unit which is easily constructed and which operates to reliably cool and clean hot exhaust gases without a requirement for costly separate filtering devices. Further, the heat exchange and filtering unit is constructed to provide for a periodic cleaning of the unit, thereby eliminating a requirement for removal and replacement of filtering devices.

It is known in the prior art to dispense sand and other materials from vehicles by utilizing exhaust gases from an engine carried on the vehicle. Such prior art devices are illustrated in Meakin Patent 1,277,333 and Mahoney et al. Patent 1,294,929, and such devices include some means for bypassing exhaust gases from an internal combustion engine into a dispensing hopper which carries sand to be dispensed. Another type of construction is shown in the French Patent 719,809 wherein some attempt is made to filter hot exhaust gases through a conventional filtering means prior to utilizing the hot exhaust gases. Also, the French patent appears to show the use of cooling water from a radiator of an engine to assist in the cooling of hot exhaust gases.

The present invention represents an improvement over the types of structures mentioned above in the prior art. The improvement of the present invention resides in the development of a heat exchange and cleaning unit which is easily constructed and which operates reliably to cool and to clean or filter hot exhaust gases without a requirement for conventional filtering pads or similar filtering devices. The cooling and cleaning unit of the present invention utilizes water from the water jacket of an internal combustion engine without interfering with the normal operation of the engine. Further, the unit of the present invention provides for a cleaning of hot exhaust gases from the engine by precipitating out and otherwise settling out the heavy soot particles in the hot exhaust gases so that the gas can be utilized in a fluidizing and dispensing operation. The unit of this invention is especially adaptable for use on trailer truck vehicles of the type described in my copending application Ser. No. 510,589, filed Nov. 30, 1965 (now Patent 3,311,269 dated Mar. 28, 1967), and in that application a novel dispensing system is described for removing pulverulent material from a tank of a trailer. The dispensing system requires the use of pressurized gas to assist in fluidizing and dispensing the pulverulent material, and it has been necessary in the past to provide a separate source of compressed air or other gas to operate the described dispensing system. With the present invention, it is possible to utilize the exhaust gases from the engine of the tractor vehicle, and the exhaust gases are treated sufficiently to provide a cooled and cleaned source of compressed gas which will adequately fluidize and dispense material from the trailer hoppers. Of course, it should be recognized that untreated hot exhaust gases from an internal combustion engine would possibly react with or otherwise affect the material which is to be dispensed. Accordingly, it is desirable to cool the exhaust gases to a desired temperature level, and likewise, it is necessary to remove substantially all heavy soot particles from the exhaust gases before they are utilized in the dispensing operation.

The heat exchanger and cleaning unit of this invention includes a unit through which the gases are passed in a tortuous path for cooling and cleaning. A conduit runs back and forth through the unit and through a water jacket contained within the unit for the cooling and cleaning treatment. The heat exchanger and filtering (or cleaning) unit includes connections to the cooling system of the internal combustion engine, and also, connections are provided for bypassing exhaust gases from the internal combustion engine and through the tortuous path provided within the unit. The unit of this invention also includes a means for opening one end of the unit and for exposing opened ends of all conduits contained therein. By opening the end of all conduits, it is possible to quickly and easily clean precipitated soot and other particles from the unit by a brush or compressed air cleaning device. In this manner, it is not necessary to remove and replace any filtering pads or other filtering devices which might otherwise restrict the flow of exhaust gases through the unit or the system, and yet, an adequate filtering, or cleaning, of the gases is provided.

These and other advantages of the present invention will become apparent in the more detailed discussion which follows, and in that discussion reference will be made to the accompanying drawings in which.

*Detailed description of invention*

Figure 1:
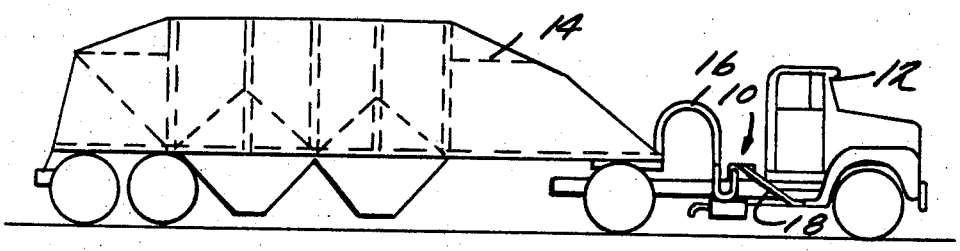
FIGURE 1 is a side elevational view of a tractor trailer combination showing the relative positioning of the heat exchanger and filtering unit of this invention.

Referring to FIGURE 1, the heat exchanger and filtering unit 10 is illustrated in a particular application to a tractor trailer type of vehicle, although, it is contemplated that the unit may be used wherever it is desired to utilize or to treat hot exhaust gases from an internal combustion engine. In the adaptation shown in FIGURE 1, the unit 10 is mounted on a portion of the truck 12 for being permanently carried thereon. The trailer 14 which is illustrated is an all purpose transport trailer which may carry a variety of materials for transportation and ultimate dispensing. When the trailer 14 is utilized for carrying pulverulent materials, a pneumatic fluidizing and dispensing system may be required for handling the materials. A type of trailer construction which utilizes such a system is disclosed in my copending application Ser. No. 510,589. When it is desired to unload pulverulent material from the trailer 14, it is necessary to at least partially fluidize the material at the point of discharge from the trailer, and also pneumatic pressure may be used for assisting in the actual discharge movement of material from the trailer hoppers. The heat exchanger and filtering unit 10 of this invention is provided to treat hot exhaust gases produced by an operating internal combustion engine of the truck 12. It is necessary to treat hot exhaust gases in order to cool and also to clean them before they can be used in such an unloading operation because the gases might otherwise affect or react with the particular materials being discharged. Also, it is desirable to remove soot particles from the exhaust gases in order to prevent an accumulation of soot in the dispensing pads or other devices located in the trailer unit. Accordingly, the unit 10 of this invention provides for such a cooling and cleaning treatment of the gases, and a removable conduit means 16 may be connected to the discharge system of the trailer 14 to carry the treated gases to the discharge doors associated with the trailer.

Figure 2:
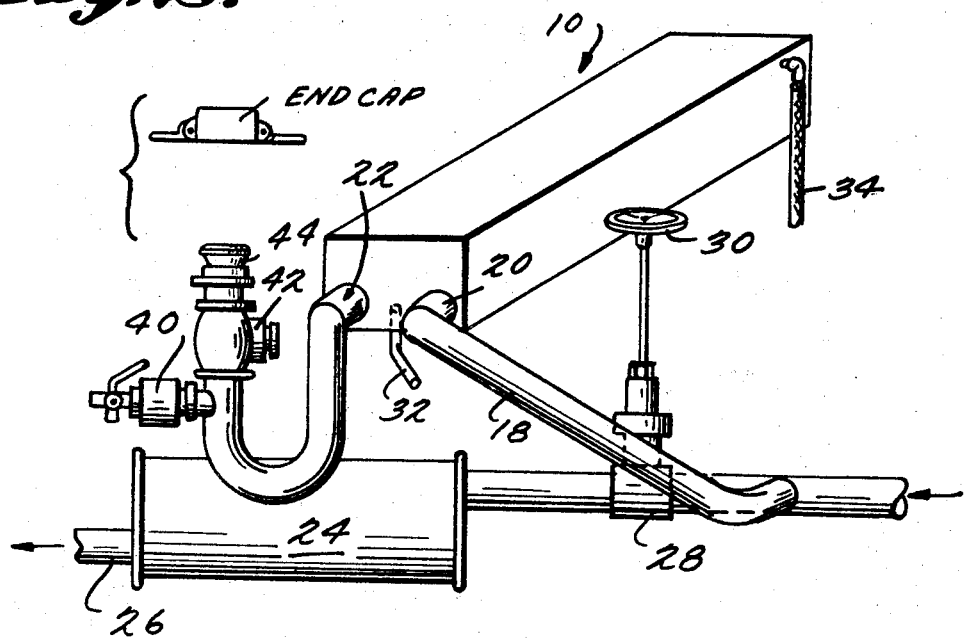
FIGURE 2 is a perspective view of the heat exchanger filtering unit as related to the exhaust system from an internal combustion engine and showing connections to the cooling system for an internal combustion engine.
Figure 5:
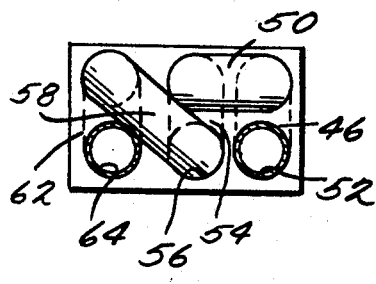
FIGURE 5 is an end elevational view taken on line 5—5 of FIGURE 3.
Figure 6:
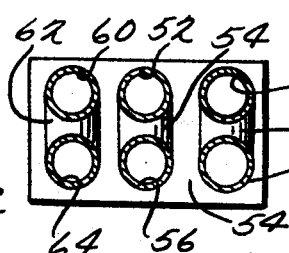
FIGURE 6 is an end elevational view of an end opposite to that shown in FIGURE 5, as taken on the lines 6—6 of FIGURE 3.

FIGURE 2 illustrates an outside perspective view of the heat exchanger and filtering unit 10, and the unit is shown in relation to a conventional exhaust system normally associated with a truck and internal combustion engine. The unit 10 includes a box-like housing through which exhaust gases are passed for cooling and cleaning. As shown in the figure, the exhaust gases from the internal combustion engine of the truck 12 may be bypassed into a conduit 18 which enters the unt 10 through the connecting pipe 20 which is the beginning portion of a tortuous path conduit means passing back and forth within the unit 10 until it exits at the point 22. The exhaust system for the vehicle or truck includes a conventional muffler 24 and exhaust pipe 26, and of course, the exhaust gases from the vehicle engine normally passes through the muffler and exhaust pipe when the vehicle is utilized for highway travel. When it is desired to bypass the conventional exhaust system of the vehicle and to treat exhaust gases in the unit 10, a gate valve 28 (of any well known construction) is operated by the handle 30 to close off the usual exhaust system and to cause exhaust gases to pass into the pipe 18 and into the unit 10. The control handle 30 or the gate valve 28 may include a relatively long operating shaft so that the valve can be easily operated by an operator in the truck of the vehicle.

The unit 10 also includes tubing connections for carrying water from the cooling system of the internal combustion engine into the unit housing and back to the water pump associated with the engine. An intake tube or pipe 32 receives water from the water jacket, or other cooling portion, of the internal combustion engine, and water enters the housing of the unit 10 to surround the conduit means therein which is carrying the hot exhaust gases along a tortuous path. Water is circulated out of the housing of the unit 10 through the tube 34 which returns water to the cooling system of the vehicle engine. In a preferred construction the water may be returned to the water pump normally associated with an engine, and in this way, the water pump assists in a circulation of cooling water through the unit 10. Thus, as hot exhaust gases are passed back and forth through the unit 10 in a conduit means (which will be described in greater detail below), the exhaust gases are cooled by the water within the unit which surrounds the conduit means passing therethrough. Of course, it is understood that the outer jacket or housing of the unit, and all conduit and tubing connections thereto, are water tight so that there is no leakage of water from the heat exchanger filtering unit 10. The conduits 32 and 34 which carry water to and from the unit may be made of rubber tubing which is suitably attached to metal fittings on the unit, or any other type of conventional hosing material may be used. The conduit 18 which carries hot exhaust gases from the exhaust system of the vehicle into the unit may be made of metal tubing, and all of the conduit system within the unit is likewise formed from suitable metal material. The exit portion 22 of the conduit means within the unit 10 continues beyond the unit to include a safety valve 40 and a check valve 42. A terminal end of the exit conduit includes a conventional coupling device 44 for receiving the flexible conduit 16 from the trailer discharge sytsem. The means for couplling the flexible conduit 16 of the trailer to the coupling device 44 are well known in the art and they include any means for providing a quick connect or release mechanism between hoses or pipes. When the unit is not in use the terminal end of the exit conduit is capped by a suitable closure means which can be easily removed.

In a typical construction, the outside jacket of the unit 10 is built to withstand a hydrostatic pressure of approximately 20 pounds. This is more than the pressure of about 6 pounds under which radiators on trucks usually operate, however, the additional pressure capacity of the unit assures a safety margin in operation. In a construction of a unit having outside dimensions of approximately 5 feet in length, 8 inches in height, and 1 foot in width, and utilizing conduits of 3 inch diameter for conducting exhaust gases through the unit, it has been found that hot gases entering the unit at 550 to 600 degrees F. are cooled to approximately 240 degrees F. upon leaving the unit. Such a system uses water from the cooling system of the vehicle engine which is at a temperature of approximataly 180 degrees F.

Referring to FIGURES 3 through 6, the conduit system within the unit 10 is illustrated in detail, and the outside jacket portion for the unit is shown in dotted lines. The conduit system comprises a series of relatively large diameter (for example, three inch diameter) metal tubes which pass back and forth through the unit to be cooled by contact with water contained within the unit. The conduit means provides for a tortuous path of exhaust gases back and forth through the unit, and it has been found that the particular path together with the cooling action which takes place within the unit causes a precipitation and removal of soot and other particles from the exhaust gases which is sufficient to permit the use of the gases in the dispensing of pulverulent material from the trailer 14. The cooling and cleaning treatment of the gases is so effective with the unit of this invention that it is not necessary to utilize any separate filtering pads or devices in the treatment of the hot exhaust gases. However, if the exhaust gases are to be utilized in a specialized operation, it may be desirable to also filter the gases through a separate filtering means.

With the conduit system illustrated, hot exhaust gases enter the unit 10 at the pipe portion 20 and continue for the whole length of the unit through the remainder of the pipe 20. At an opposite end of the unit, the gases rise upwardly through a riser connection 46 and then pass back for the full length of the unit through the pipe 48. The movement of the exhaust gases back and forth through the unit continues through the pipes 50 through 64 in the flow path indicated in the figures. The cooled and cleaned exhaust gas exits from the unit through the pipe 64 at the point 22. The illustrated arrangement of conduits through the unit provides for water circulation around each of the conduits and for a good heat exchange relationship betwen the water and the conduits as they pass back and forth through the unit. Thus, the hot exhaust gases are adequately cooled for dispensing uses by the heat exchange unit of this invention.

Figure 3:
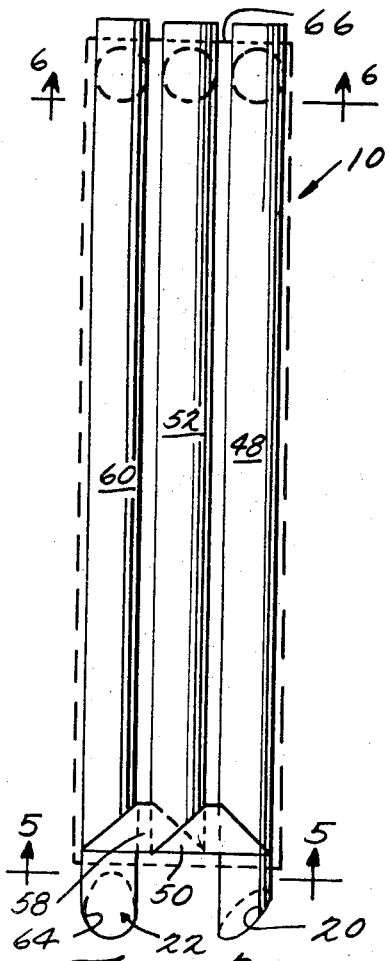
FIGURE 3 is a top plan view of the said unit showing in detail the conduit structure which provides a tortuous path for hot exhaust gases through the unit.
Figure 4:
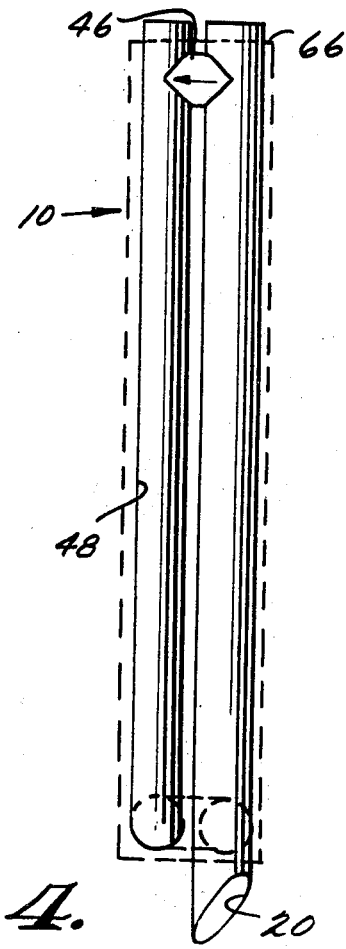
FIGURE 4 is a side elevational view taken on lines 4—4 of FIGURE 3.
Figure 7:
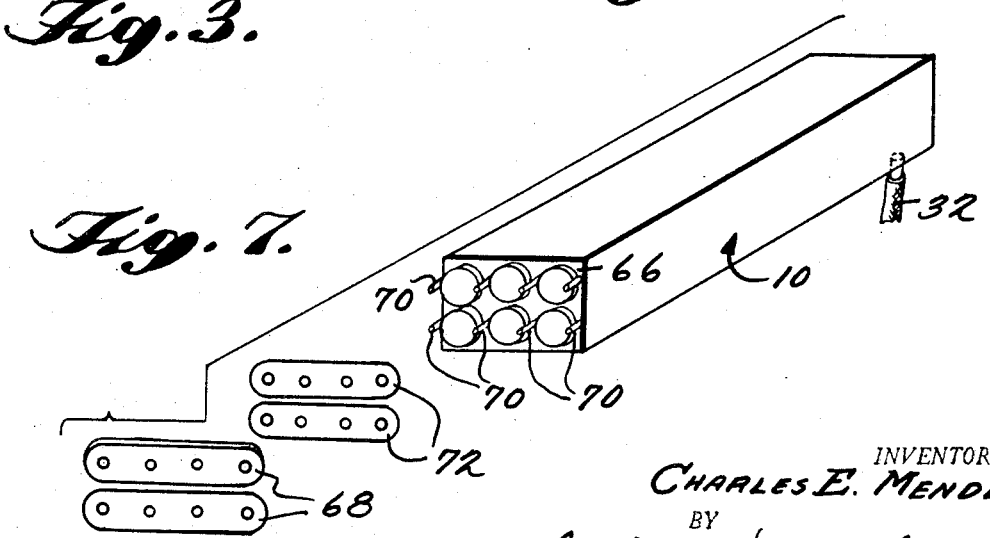
FIGURE 7 is an exploded perspective view of the unit from the opposite end shown in FIGURE 2, and illustrating removable end plates which provide for an access to all of the conduits within the unit for cleaning.

A further feature of the present invention resides in the particular construction of the heat exchange and filtering unit 10 to provide for an ease of access into the unit for cleaning the conduits within the unit. FIGURE 7 illustrates an end of the unit 10 with end plates removed to expose opened end portions for each of the conduits 22, 48, 52, 56, 60, and 64. As shown in FIGURES 3 and 4, the just named conduits are constructed to extend through an end wall 66 of the unit housing. The named conduits wich extend beyond the end wall 66 are completely open until they are covered by the cover plates 68 which each cover a row of three conduit ends. Of course, the end plates may be designed in other configurations or in the configuration of a single end plate wall which will fit over all exposed conduit ends. When the illustrated plates are used, separate mounting bolts 70 are attached in spaced positions along the wall 66 of the unit, and the plates include openings to receive the spaced bolts 70. Thus, when the plates are to be mounted on the exposed ends of the conduits, the plates are merely aligned with the bolts 70 and then slid into a tight position against the exposed conduits. Gasket means 72 may be first inserted over the exposed ends to assure a tight sealing relationship betwen the end plates and the exposed conduits. When the plates and gaskets are in position, nuts may be threaded over each of the bolts 70 to tighten the end plates against the open ends of the conduits. In this manner, the unit is closed and sealed for normal usage, but when it is desired to clean the conduits contained therein, the end plates can be removed for the cleaning operation. It has been found that the particular arrangement of conduits within the units provides for an adequate access to the conduits for cleaning out accumulated soot and other particles. By removing the end plates from the unit, it is possible to periodically brush the precipitated particles out of the conduits. Alternatively, compressed air may be used to clean the conduits when the end plates are removed.

Having described the constructional features of the present invention, it can be seen that there is provided a useful and easily constructed single unit which cools and cleans hot exhaust gases from an internal combustion engine. There is no requirement for interfering with the normal operation of the internal combustion engine, and there is no requirement for the use of additional filtering devices which might otherwise interfere with a continued use of exhaust gases for the type of dispensing operation contemplated. In operation, the unit is used by removing the end cap from the exit pipe 22 and connecting the flexible hose 16 thereto. Then, the gate valve 28 is closed by the operator to develop the necessary pressure which is required to operate the dispensing system on the trailer. In practice, it is required that approximately 15 pounds of pressure be developed for operating the dispensing system described in my above referred to pending application. The safety valve 40 can be pre-set at approximately 18 pounds pressure on the discharge side of the unit 10, and also the check valve 42 can be set to open if too great a pressure is developed within the tank. Of course, it is important to prevent a development of a high pressure within the unit which would cause a blow back of exhaust gases into the engine of the tractor, and the check valve 42 prevents such a blow back.

Variations in the described invention will become apparent to those skilled in the art, and such variations are intended to be included within the scope of this invention.

What is claimed is:

1. In a dispensing or fluidizing system for pulverulent material which utilizes a compressed gas to fluidize or dispense said material from a container, and including a unit for treating hot exhaust gas from an internal combustion engine for use as the compressed gas in said system, the improvement in said unit comprising:

a heat exchange and filtering unit which cools hot exhaust gas from said engine and which settles particles from the hot exhaust gas, said heat exchange and filtering unit having a water-tight housing within which a conduit means extends back and forth for carrying said hot gas along a tortuous path, said housing being filled with water around said conduit means for cooling the hot gas moving through the conduit means, said conduit means being in the form of a plurality of pipes extending for the length of the unit and spaced in parallel positions relative to one another within the unit, said pipes being interconnected to define essentially a single flow path for said exhaust gas back and forth within the unit from the inlet end of said conduit means to the outlet end of said conduit means, and said conduit means including open-ended portions of said plurality of pipes extending through a wall of said housing for providing an access to said plurality of pipes for cleaning the same, said open-ended portions of said conduit means being provided with a cover plate means for sealing off the ends of said portions when the heat exchanger and filtering unit is being operated, a bypass pipe connected between said unit and the exhaust system of said internal combustion engine for receiving hot exhaust gas from the exhaust system, and valve means positioned downstream from said bypass pipe and in said exhaust system for closing off the exhaust system and diverting hot exhaust gas into said bypass pipe and into said heat exchanger and filtering unit, tubing means leading into and out of said housing for circulating water through said housing, said tubing means being connected into the cooling system of said internal combustion engine for circulating water from the engine cooling system into the housing, and means for conducting cooled and cleaned gas from said unit into said dispensing system.

2. The improvement of claim 1 and including safety valve means in said system for preventing an excessive build up of pressure within said unit.

References Cited

UNITED STATES PATENTS

| 1,327,769 | 1/1920 | Molas. |
| 2,545,766 | 3/1951 | Cline _____ 214—83.28 |
| 3,050,935 | 8/1962 | Eastwood. |

FOREIGN PATENTS

| 719,809 | 11/1931 | France. |
| 942,634 | 5/1956 | Germany. |

MARTIN P. SCHWADRON, *Primary Examiner.*